US009952557B2

(12) United States Patent
Shaltout et al.

(10) Patent No.: US 9,952,557 B2
(45) Date of Patent: Apr. 24, 2018

(54) SYSTEM FOR PRODUCING ULTRA-THIN COLOR PHASE HOLOGRAM WITH METASURFACES

(71) Applicant: Purdue Research Foundation, West Lafayette, IN (US)

(72) Inventors: Amr Shaltout, West Lafayette, IN (US); Sajid Choudhury, West Lafayette, IN (US); Alexander V. Kildishev, West Lafayette, IN (US); Alexandra Boltasseva, West Lafayette, IN (US); Vladimir M. Shalaev, West Lafayette, IN (US)

(73) Assignee: PURDUE RESEARCH FOUNDATION, West Lafayette, IN (US)

(*) Notice: Subject to any disclaimer, the term of this patent is extended or adjusted under 35 U.S.C. 154(b) by 3 days.

(21) Appl. No.: 15/152,535

(22) Filed: May 11, 2016

(65) Prior Publication Data
US 2016/0334758 A1 Nov. 17, 2016

Related U.S. Application Data

(60) Provisional application No. 62/159,762, filed on May 11, 2015.

(51) Int. Cl.
*G03H 1/02* (2006.01)
*H01Q 15/00* (2006.01)
(Continued)

(52) U.S. Cl.
CPC ............. *G03H 1/02* (2013.01); *G02B 1/00* (2013.01); *G02B 1/002* (2013.01); *G02F 1/00* (2013.01);
(Continued)

(58) Field of Classification Search
CPC .. G02F 1/01; G02F 1/00; G02B 1/002; G02B 1/00; H01Q 15/0006; H01Q 15/10;
(Continued)

(56) References Cited

U.S. PATENT DOCUMENTS

| 8,669,833 B2* | 3/2014 | Ueda | G02B 1/002 333/202 |
| 8,848,273 B2* | 9/2014 | Yu | G02F 1/01 359/238 |

(Continued)

OTHER PUBLICATIONS

Montelongo et al., "Plasmonic nanoparticle scattering for color holograms", Sep. 2, 2014, PNAS, vol. 111, No. 35, 12679-12683, www.pnas.org/cgi/doi/10.1073/pnas.1405262111.*

(Continued)

*Primary Examiner* — William R Alexander
(74) *Attorney, Agent, or Firm* — Purdue Research Foundation

(57) ABSTRACT

A device for producing a subwavelength hologram. The device comprises a metasurface layer attached to a substrate. The metasurface layer includes an array of plasmonic antennas that simultaneously encode both wavelength and phase information of light directed through the array to produce a hologram. The wavelength is determined by the size of the antennas, and the phase is determined by the orientation of the antennas.

26 Claims, 5 Drawing Sheets

(51) Int. Cl.
  *G02B 1/00* (2006.01)
  *H01Q 15/10* (2006.01)
  *G02F 1/01* (2006.01)
  *G02F 1/00* (2006.01)
  *G03H 1/22* (2006.01)

(52) U.S. Cl.
  CPC .............. *G02F 1/01* (2013.01); *G03H 1/024* (2013.01); *G03H 1/0244* (2013.01); *H01Q 15/0006* (2013.01); *H01Q 15/10* (2013.01); *G03H 2001/026* (2013.01); *G03H 2001/2263* (2013.01); *G03H 2240/11* (2013.01); *G03H 2240/21* (2013.01)

(58) Field of Classification Search
  CPC ........ G03H 1/02; G03H 1/024; G03H 1/0244; G03H 2001/026; G03H 2001/2263
  USPC .................................................. 359/238, 32
  See application file for complete search history.

(56) References Cited

U.S. PATENT DOCUMENTS

| | | | | |
|---|---|---|---|---|
| 8,969,850 B2* | 3/2015 | Brown | ................... | B82Y 30/00 257/20 |
| 2009/0008925 A1* | 1/2009 | Blondiaux | ............... | G07D 7/00 283/85 |
| 2011/0315898 A1* | 12/2011 | Capasso | ................ | B82Y 20/00 250/492.1 |
| 2012/0050732 A1* | 3/2012 | Lu | .......................... | B05D 1/204 356/301 |
| 2013/0075699 A1* | 3/2013 | Brown | ................... | B82Y 30/00 257/21 |
| 2013/0208332 A1* | 8/2013 | Yu | ............................ | G02F 1/01 359/240 |
| 2013/0321902 A1* | 12/2013 | Choi | ........................ | H01S 5/34 359/344 |
| 2015/0288318 A1* | 10/2015 | Guler | ..................... | G02B 1/002 136/253 |

OTHER PUBLICATIONS

Huang et al., "Aluminum Plasmonic Multicolor Meta-Hologram", Apr. 6, 2015, Nano Lett. 2015, 15, 3122-3127, DOI: 10.1021/acs.nanolett.5b00184.*

Dorfmuller et al. "Plasmonic Nanowire Antennas: Experiment, Simulation, and Theory", Aug. 20, 2010, American Chemical Society, Nano Lett. 2010, 10, 3596-3603, https://www.fkf.mpg.de/49875/kk588.pdf.*

Garcia-Vidal et al., "Surfaces with holes in them: new plasmonic metamaterials", Jan. 20, 2005, IOP Publishing Ltd, J. Opt. A: Pure Appl. Opt. 7 (2005) S97-S101, http://iopscience.iop.org/article/10.1088/1464-4258/7/2/013/pdf.*

X. Ni, A. V. Kildishev, and V. M. Shalaev, "Metasurface holograms for visible light," Nat Commun 4, (2013).

L. Huang, X. Chen, Fl Mühlenbernd, H. Zhang, S. Chen, B. Bai, Q. Tan, G. Jin, K.-W. Cheah, C.-W. Qiu, J. Li, T. Zentgraf, and S. Zhang, "Three-dimensional optical holography using a plasmonic metasurface," Nat Commun 4, (2013).

J. Lin, P. Genevet, M. A. Kats, N. Antoniou, and F. Capasso, "Nanostructured Holograms for Broadband Manipulation of Vector Beams," Nano Lett. 13,4269-4274 (2013).

M. Ozaki, J. Kato, and S. Kawata, "Surface-Plasmon Holography with White-Light Illumination," Science 332,218-220 (2011).

W. T. Chen, K.-Y. Yang, C.-M. Wang, Y.-W. Huang, G. Sun, I.-D. Chiang, C. Y. Liao, W.-L. Hsu, H. T. Lin, S. Sun, L. Zhou, A. Q. Liu, and D. P. Tsai, "High-Efficiency Broadband Meta-Hologram with Polarization-Controlled Dual Images," Nano Lett. 14,225-230 (2014).

Y. Montelongo, J. O. Tenorio-Pearl, C. Williams, S. Zhang, W. I. Milne, and T. D. Wilkinson, "Plasmonic nanoparticle scattering for colorholograms," Proc. Natl. Acad. Sci. 111,12679-12683 (2014).

* cited by examiner

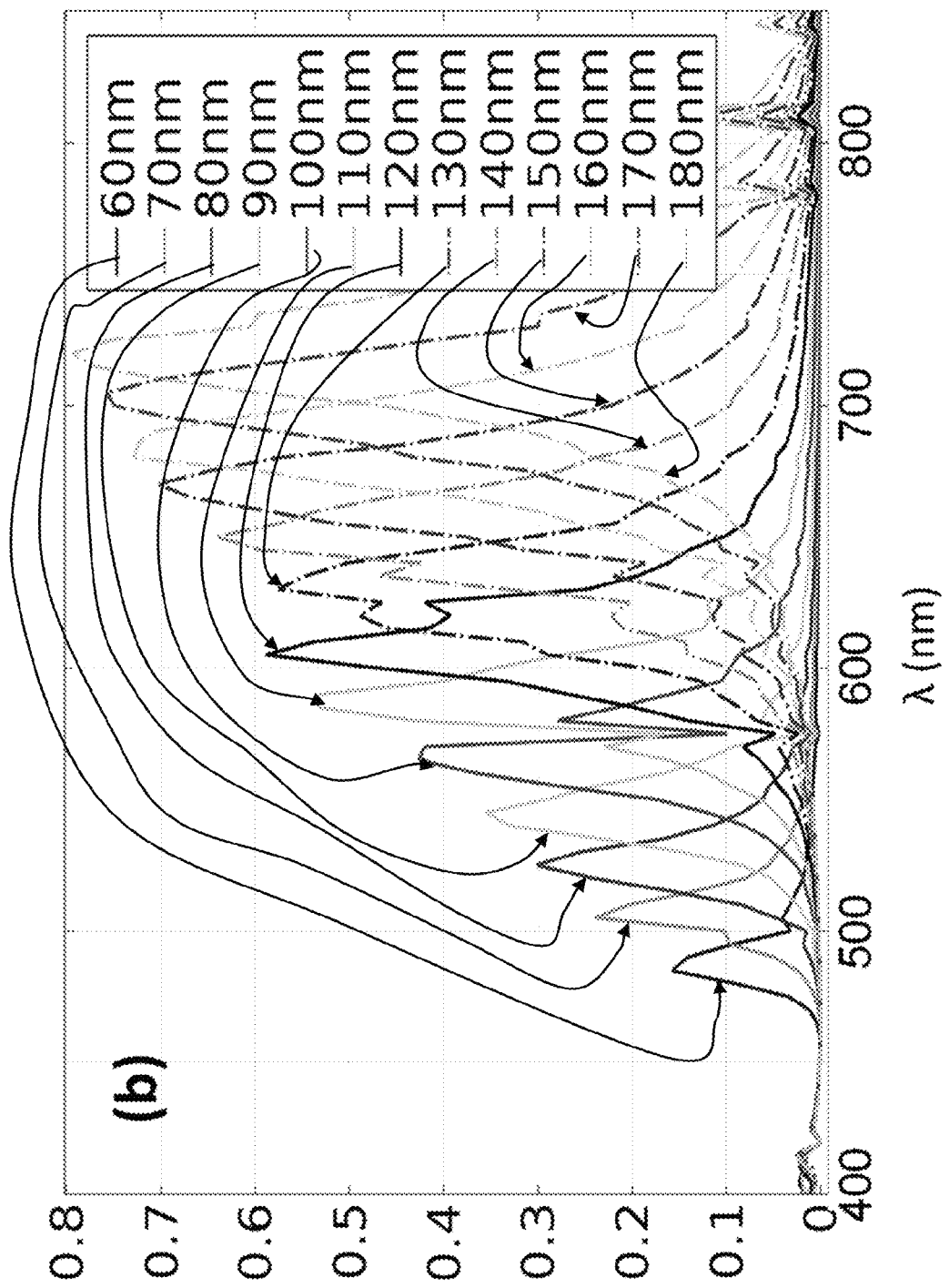

SYSTEM FOR PRODUCING ULTRA-THIN COLOR PHASE HOLOGRAM WITH METASURFACES

CROSS-REFERENCE TO RELATED APPLICATIONS

The present patent application is related to and claims the priority benefit of U.S. Provisional Patent Application Ser. No. 62/159,762, filed May 11, 2015, the contents of which is hereby incorporated by reference in its entirety into this disclosure.

STATEMENT REGARDING GOVERNMENT FUNDING

This invention was made with government support under W911NF-13-1-0226 awarded by the Army Research Office, FA9550-14-1-0389 awarded by the Air Force Office of Scientific Research; and DMR1120923 awarded by the National Science Foundation. The government has certain rights in the invention.

TECHNICAL FIELD

The present disclosure relates to nanophotonic devices, and more specifically, production of color holograms using nanophotonic techniques.

BACKGROUND

Holography is a technique that reproduces 3D images of objects. Holograms are images obtained by encoding a surface profile of a light field (amplitude and phase) rather than light intensity. A reference light beam is used to write the hologram profile, and then to reproduce the original image when applied to the profile.

Computer generated holograms have been introduced which eliminate the need to write holograms using interference of two light sources. In some applications, computed holograms are patterned on films using lithography techniques.

With the advances of metasurfaces composed of plasmonic nano-antennas, ultrathin subwavelength holograms have been obtained by utilizing the ability of plasmonic nano-antennas to introduce an abrupt change to the phase of the incident beam.

Monochromatic ultrathin metasurface holograms have also been developed where antennas dimensions were designed to tailor the induced phase-shift, therefore enabling the development of monochromatic phase holograms. Most of these holograms have binary amplitude modulation (corresponding to existence or absence of nano-antennas).

Monochromatic holograms have a maximum storage capacity due to the diffraction limitation imposing a minimum distance of $\lambda/2$ between antennas to be distinguishable in the far-field.

Binary color holograms have been produced to increase the maximum capacity of the encoded hologram beyond the diffraction limit. In this structure, antennas dimensions are tailored to encode wavelength (color), instead of phase. However, such binary color holograms only enable binary encoding of data (existence or absence antennas), and do not encode phase information. Therefore, improvements are needed in the field.

SUMMARY

According to one aspect, the present disclosure provides a device for producing a multi-color subwavelength hologram. The device comprises a transparent substrate and a metasurface layer attached to the substrate. The metasurface layer includes an array of plasmonic antennas that simultaneously encode both wavelength and phase information of light directed through the array to produce a hologram. The antennas may comprise anisotropic openings in the metasurface layer. The openings may comprise rectangles, ellipses, or any other anisotropic shape. The orientation of the antennas determines the encoding of the phase data, while the size or shape of the antennas determines the wavelength.

According to certain aspects, the antennas may be grouped into a plurality of size groups, with each size group providing a image for one of a plurality of colors. The images from the different size groups are then combined to provide a multi-color holographic image.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 2(b) shows numerical simulation results of transmission for different slit lengths ($w_y$), for $w_x=30$ nm, and using a silver film of thickness t=40 nm. Different antenna lengths correspond to different peak wavelengths (different colors). Transmission peaks from shorter to longer wavelengths correspond to monotonic increase of $w_y$ from 60 nm to 180 nm.

DETAILED DESCRIPTION

In order to encode both wavelength and phase simultaneously, another degree of freedom other than the antenna dimensions is needed. To provide this additional degree of freedom, the present disclosure provides a device which utilizes a plurality of anistropic antennas on a metasurface, wherein the orientation of the antennas is used to encode phase using the Pancharatnam-Berry phase effect (or geometric phase) to produce a hologram. According to this effect, a phase-shift whose value is double the antenna orientation angle is induced to circularly polarized components of light directed through the metasurface. The antennas size (e.g., length) is then used to provide wavelength selectivity, to allow both wavelength and phase to be encoded by the device.

For color imaging and display applications, it is typically sufficient to include antennas that resonate at three wavelengths which correspond to the three primary colors (red, green and blue). Each antenna may be oriented to produce a geometric phase shift. Three phase holographic images are generated with red, green and blue colors, which correspond to the three antenna sizes. The three images are then combined together to compose a multicolor image. In other embodiments, more or less than three antenna size groups may be used.

The present disclosure provides a novel approach for producing a color phase hologram with an ultrathin deeply subwavelength metasurface. The system is composed of an array of nano-antennas which simultaneously encode color and phase information. The antennas lengths encode resonant wavelength (color), while the antennas orientations encode the phase information through utilizing the Pancharatnam-Berry phase effect. The disclosed device is useful in encoding data at a storage capacity exceeding the diffraction limitation. It may also be used for multi-color holographic imaging by composing three images at red, green and blue colors using phase holography.

Figure 1:
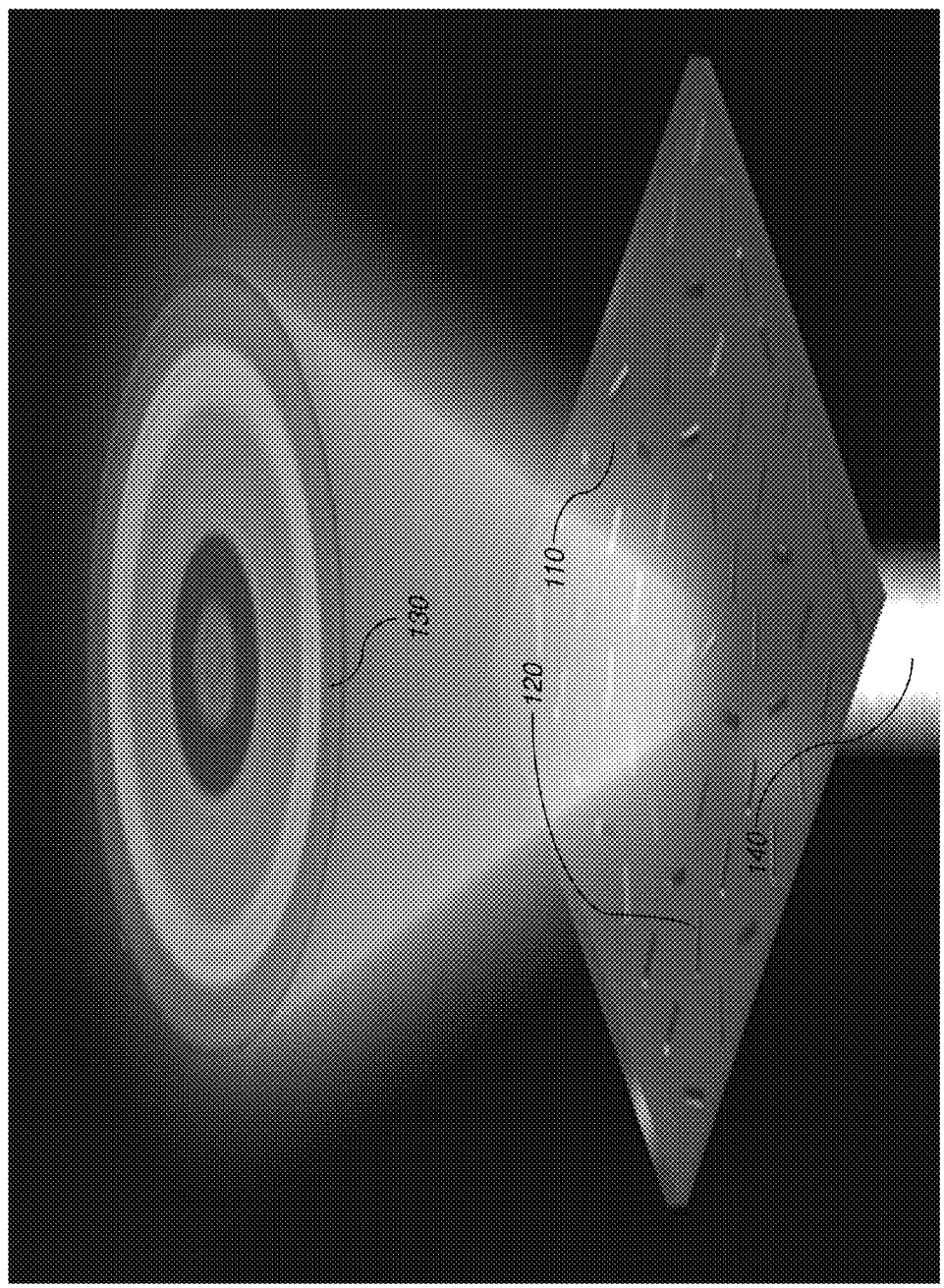
FIG. 1 shows a conceptual illustration of color hologram according to one embodiment. An array of rectangular nano-slit antennas with different lengths to filter light at different wavelengths is provided, and the antennas are oriented at different angles to induce different phase-shifts. Thus a phase color holographic image is generated. The figure illustrates conceptual generation of concentric rings with multiple colors with red at the outer radius from white light illumination.

FIG. 1 shows a system for producing a color hologram 130 according to one embodiment. The system includes a metasurface layer 110 which comprises an array of plasmonic nano-antennas 120 as shown. A light source 140 is directed from a first side of the metasurface 110. The light passes through the metasurface 110, and an image 130 is produced on the opposite side of the metasurface. Each antenna 120 encodes both wavelength (color) and phase-shift. The wavelength is encoded by tailoring the antenna lengths, and the phase is encoded by tailoring the antenna orientation angles. By adjusting the antenna size (e.g., antenna length or width), the transmission peak of an orthogonally polarized light (such as light source 140) can be changed.

The resulting hologram is a phase hologram, obtained as the solution of an inverse design problem. The wavefront phases of a given image or computed at a given distance, and a synthesized metasurface is then used to artificially produce the same phase shift within the metasurface.

Nano-slit antennas in a metallic metasurface layer are shown in the illustrated embodiment. However, any plasmonic material can be used to construct the metasurface antenna array. The metasurface material may comprise, for example, metals such as silver, gold, aluminum, copper, or other metallic materials. The metasurface material may also comprise ceramics, such as titanium nitride. The thickness of the metasurface layer is preferably in the order of tens of nanometers. In certain embodiments, the metasurface layer thickness is between 5 and 100 nanometers. In further embodiments, the metasurface layer thickness is between 20 and 60 nanometers. The nano-antennas can be rectangular, elliptical, or with any other anisotropic geometry.

Figure 2A:
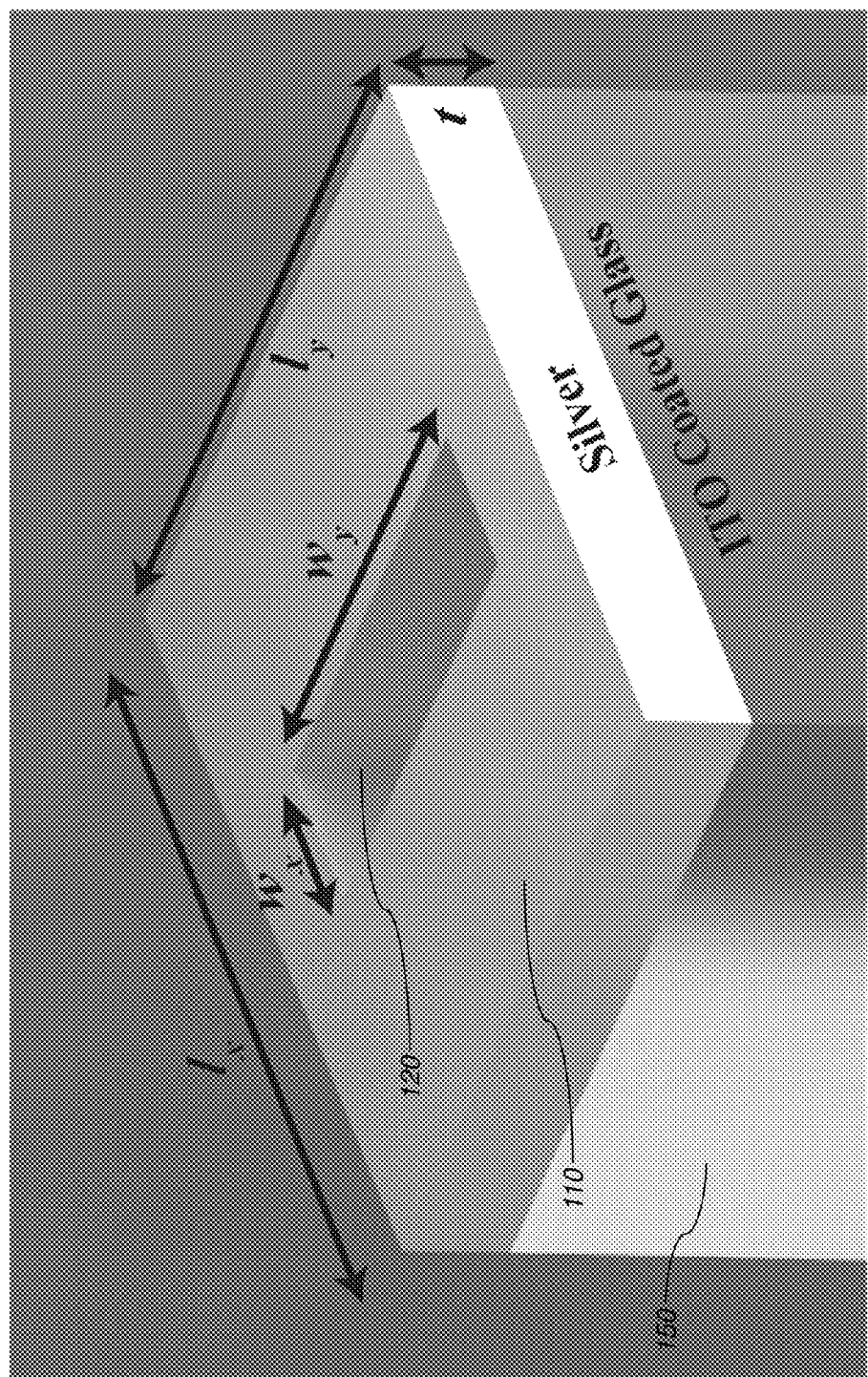
FIG. 2(a) shows a metallic nano-slit antenna with rectangular dimensions of $w_x \times w_y$ with a periodicity of $l_x \times l_y$. The metal need not be silver, and the substrate could be any transparent medium.

FIG. 2 illustrates the effect of antenna length on wavelength (color) coding. Simulation results are shown for the case of rectangular nano-slit antennas inside a 40 nm thick silver layer. The rectangular dimensions (see FIG. 3(a)) of the nano-antennas are $w_x=30$ nm, and are $w_y$ ranges from 60 nm to 180 nm. The resonant wavelength (color) increases with the increase of $w_y$ as shown in FIG. 2(b). In certain embodiments, the length of the antennas is between 20 and 200 nm. In other embodiments, the length of the nanoantennas is between 60 and 180 nm).

Figure 3A:
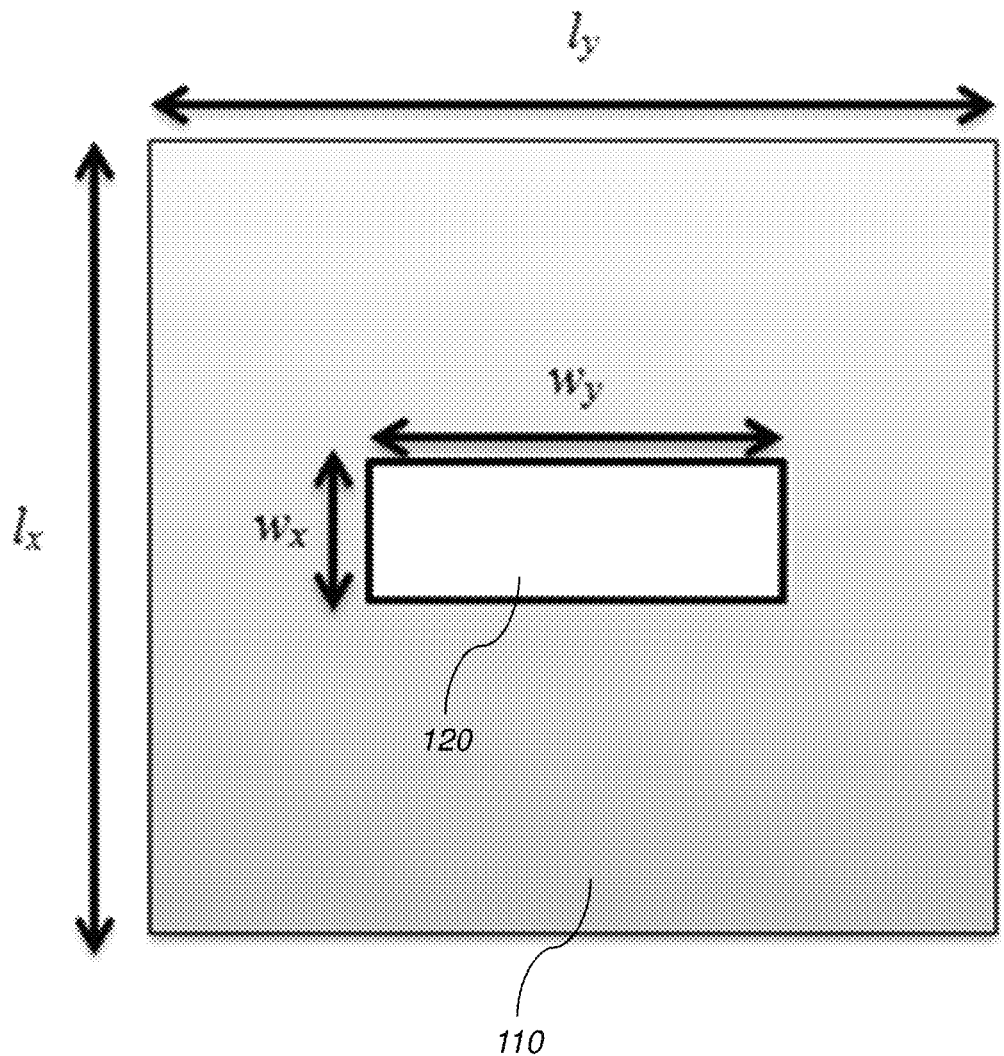
FIG. 3(a) shows a top view of the nano-slit antenna in a meta-surface layer according to one embodiment.
Figure 3B:
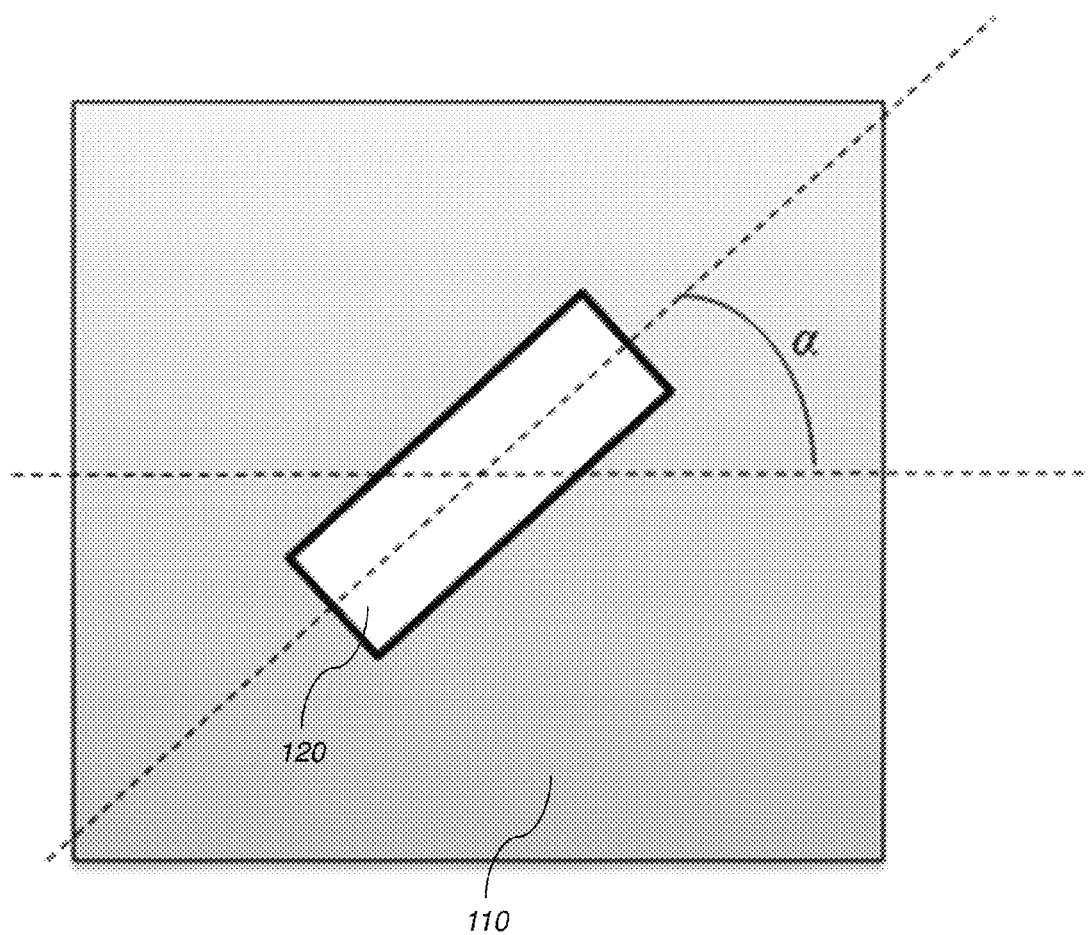
FIG. 3(b) shows the nano-slit antenna of FIG. 3(a) rotated at an angle $\alpha$ to induce a Pancharatnam-Berry phase of $2\alpha$.

For each antenna length resonant at a specific wavelength, the orientation of the antenna relative to a reference axis is utilized to encode phase information. FIG. 3(a) shows a top view of the the nano-slit antenna 120. If the antenna 120 in FIG. 3(b) is oriented at an angle a with respect to the one in FIG. 3(a), then they induce an extra phase shift of $2\alpha$ when both antennas are subject to the same reference circularly polarized beam based on the Pancharatnam-Berry phase effect. Therefore, any phase data from the continuous range from 0 to $2\pi$ can be stored, through orientation of antenna 120 at an angle from 0 to $\pi$. This requires the antenna 120 to be anisotropic, since isotropic antennas are indistinguishable with orientation. Any anisotropic shape can provide the phase encoding, including, but not limited to, rectangles and ellipses.

Other than data encoding applications, multi-color imaging can be provided using the device of FIG. 1 by using three sets of antennas with three different lengths to select the basic red, green and blue colors. The antenna orientations may then generate a phase hologram image for each color. The three images, when combined, will together generate a multi-color image. In one example, the intensities of the three colors will be combined at each point in the image to provide the required shades of color required throughout the image. The hologram image is formed as a superposition of the red, green, and blue components, with each of the three holograms generated at the same image plane. The metasurface 110 is used to compensate for the dispersion of the three sub-component images by appropriately shifting the image plane. For a perfect reconstruction of an image, the amplitude and phase components are adjustable. Within the antenna 120 structure, the phase component may be altered by rotating an antenna around its axis, while the amplitude component is fixed. In order to gain partial amplitude control, the average color amplitude may be used to determine the thresholds for the binary values which determine antenna locations. In certain embodiments, due do a weaker resonance of the blue light antennas (as compared to red light antennas), a larger number of blue light antennas and a relatively smaller number of red light antennas may be used to compensate for this difference.

The disclosed system may also be utilized in other applications, including microscopy, video displays, data coding, data storage, security scanners, and credit cards, to name a few. For example, a credit card or personal identification card may be provided which includes the device of FIG. 1.

The metasurface hologram layer may be fabricated on top of any transparent substrate 150 such as glass, silica, alumina, sapphire, magnesium oxide, or any dielectric transparent polymer. The metasurface layer may be fabricated using any deposition or lithography technique. These may include, but are not limited to, electron beam lithography, focused ion beam, electron beam deposition, chemical vapor deposition, physical vapor deposition, spin coating, photolithography, ion beam etching, etc.

The invention is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless otherwise explicitly noted. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected within the spirit and scope of the invention.

What is claimed is:

1. A device for producing a subwavelength hologram, comprising:
   a transparent substrate; and
   a metasurface layer attached to the substrate, the metasurface layer including an array of plasmonic antennas which simultaneously encode both wavelength and phase information of light directed through the array to produce a hologram, wherein each array of plasmonic antennas of the array of plasmonic antennas comprises openings.

2. The device according to claim 1, wherein the openings comprise rectangular openings.

3. The device according to claim 1, wherein the openings comprise elliptic openings.

4. The device according to claim 1, wherein the antennas are anisotropic.

5. The device according to claim 1, wherein the orientation of the antennas is configured to control said phase information.

6. The device according to claim 5, wherein the size of the antennas is configured to control said wavelength.

7. The device according to claim 1, wherein the antennas are grouped into a plurality of sizes, each of the sizes providing a selected wavelength, the output of the plurality of sizes of antennas being combined to produce a multicolor hologram.

8. The device according to claim 6, wherein the plurality of sizes comprises three sizes.

9. The device according to claim 7, wherein the three sizes of antennas correspond to red, green and blue light.

10. The device according to claim 8, wherein the output of the three sizes of antennas are combined provide a multi-color hologram.

11. The device according to claim 1, wherein the metasurface layer comprises metal.

12. The device according to claim 11, wherein the metasurface layer comprises silver.

13. The device according to claim 11, wherein the metasurface layer comprises gold.

14. The device according to claim 11, wherein the metasurface layer comprises aluminum.

15. The device according to claim 11, wherein the metasurface layer comprises copper.

16. The device according to claim 1, wherein the metasurface layer comprises ceramic.

17. The device according to claim 16, wherein the metasurface layer comprises titanium nitride.

18. The device according to claim 1, wherein the device is used for color imaging displays.

19. The device according to claim 1, wherein the device can store information beyond the diffraction limit of light enabled by multiple wavelengths operation.

20. The device according to claim 1, wherein the device is integrated within a security device.

21. The device according to claim 1, wherein the device is integrated within a credit card.

22. The device according to claim 1, wherein the device is integrated within a personal identification card.

23. The device according to claim 1, wherein the device is integrated within a data storage device.

24. A device for producing a subwavelength hologram, comprising:
   a transparent substrate; and
   a metasurface layer attached to the substrate, the metasurface layer including an array of plasmonic antennas which simultaneously encode both wavelength and phase information of light directed through the array to produce a hologram, wherein each array of plasmonic antennas of the array of plasmonic antennas comprises an opening, wherein the opening comprises a rectangular opening.

25. A device for producing a subwavelength hologram, comprising:
   a transparent substrate; and
   a metasurface layer attached to the substrate, the metasurface layer including an array of plasmonic antennas which simultaneously encode both wavelength and phase information of light directed through the array to produce a hologram, wherein each array of plasmonic antennas of the array of plasmonic antennas comprises an opening, wherein the opening comprises an elliptic opening.

26. The device according to claim 1, wherein an entirety of an opening of the openings is through a single metasurface layer.

* * * * *